Feb. 27, 1934.    B. DARRACH    1,949,114
SHIM
Filed Sept. 13, 1930    2 Sheets-Sheet 1

INVENTOR.
BRADFORD DARRACH
BY Hammond & Littell
ATTORNEYS

Feb. 27, 1934.  B. DARRACH  1,949,114
SHIM
Filed Sept. 13, 1930   2 Sheets-Sheet 2
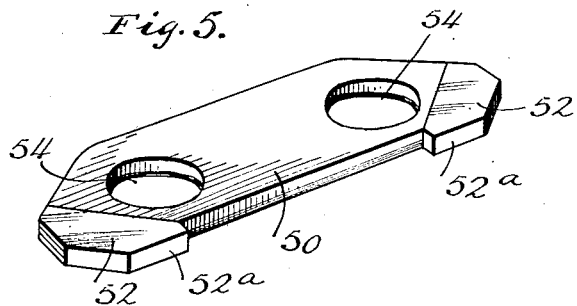
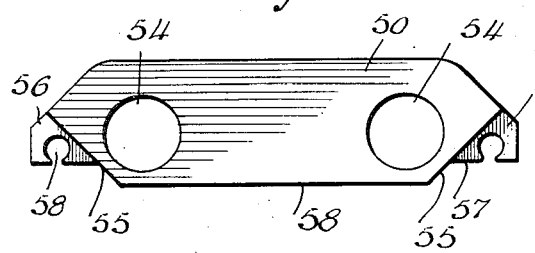
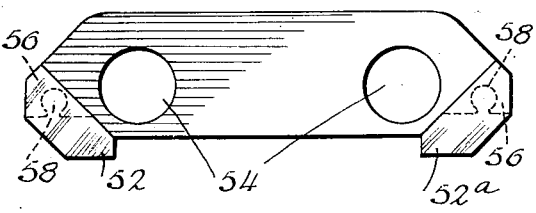
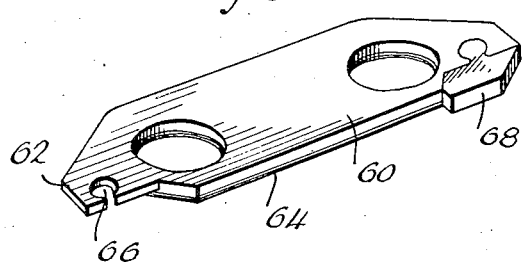
INVENTOR
BRADFORD DARRACH
BY
ATTORNEYS Patented Feb. 27, 1934

1,949,114

UNITED STATES PATENT OFFICE 1,949,114

SHIM

Bradford Darrach, New York, N. Y., assignor to Laminated Shim Co., Inc., Long Island City, N. Y., a corporation of New York Application September 13, 1930
Serial No. 481,689

8 Claims. (Cl. 308—244)

This invention relates to improvements in shims of the type which are employed in divided shaft bearings to hold the two sections of the bearings in spaced relation and which comprise a body portion and an edge facing member of babbit or other similar material adapted to engage the shaft. It is an object of this invention to provide a composite shim which may be of solid or laminated construction and a facing member of softer material cast in interlocking arrangement to secure the parts together.

Another object of this invention is to provide a shim having a facing member secured to the body portion of the shim, whereby separation of the facing member from the body portion may be effectively prevented and the shim will be less difficult to produce and more effective in service than present known shims.

Another object of this invention is to provide an interlocking engagement between the facing member and the body member of a composite shim so that the facing member is secured against lateral and transverse movement with respect to the main body portion of the shim.

Another object of this invention is to provide an improved method of casting a facing member in interlocking engagement with the body portion of a composite shim whereby disengagement of the respective portions is prevented.

Various other objects and advantages of this invention will appear from the following description thereof taken in connection with the attached drawings which illustrate preferred forms of embodiment thereof and in which:—

Figure 1 is a perspective view of a composite shim having interlocking facing pieces, Figure 2 is a top plan view partially broken away to show the internal construction of the shim, Figure 3 is a perspective view of a laminated shim before the face portion has been cast thereon, Figure 4 is a plan view similar to Figure 2 but showing a modified form of slot, Figure 5 is a perspective view of a modified form of shim, Figures 6 and 7 are plan views of the shim body before and after the face portions have been cast thereon.

Figure 8 is a front elevation of the shim shown in Figure 6, and

Figure 9 is a perspective view of a modified form of shim.

In the use of shim spacing elements in connection with divided shaft bearings and particularly in automotive construction, it has been found to be extremely desirable to affix a soft facing element 10 to the main body portion of the shim 12. Such a construction is shown in the patent to Darrach No. 1,417,039, patented May 23, 1922. The heretofore known constructions, however, have been inadequate because of the difficulty of retaining the facing portions or inserts in the body portion during transportation and often before this bearing was used, or in repair work, the facing portion would become separated or lost.

Figure 1:
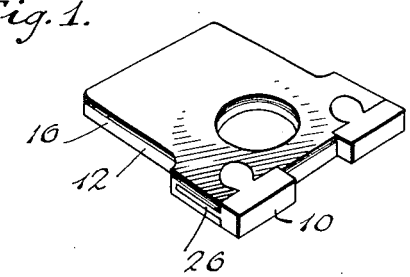
Figure 3:
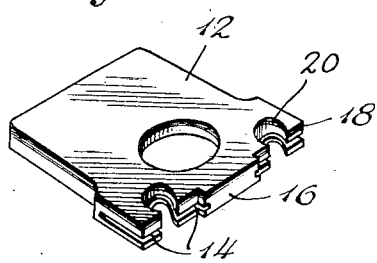
Figure 2:
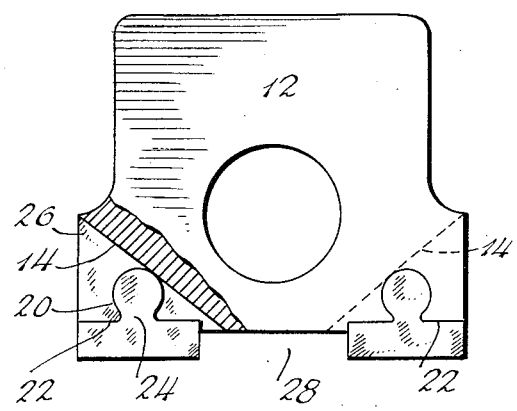

The present construction is designed to overcome this disadvantage and in the embodiment shown in Figures 1 to 3, a slot 14 is made in the corner of the shim 12 adjacent the point to which the facing portion 10 is to be secured. In a laminated shim, as shown in Figures 1 and 2, and particularly one which has a heavy solid layer 16 at the bottom and laminations 18 at the top, the slot 14 is preferably made in the solid portion 16, as shown in Figures 2 and 3. The slot may be made across the corner and may be triangular as shown or may be conveniently cut by a milling cutter and left arcuate in shape.

The shim is also transversely punched at the point 20 in such a manner that the longitudinal slot 14 and the transverse hole is spaced in such relation to the cut edge 22 that the opening 24 through the face of the body portion of the shim is less than the greater diameter of the hole 20. As particularly shown in Figure 2, this forms a neck or groove portion 24 for a purpose to be discussed hereinafter.

After the shim 12 is punched, as shown in Figure 3, babbitt is cast to form the facing portion 10, so that the babbitt is forced not only into the hole 20 but also into the slot 14 as indicated at 26. The cast facing portion equals in thickness the total thickness of the shim and projects outward from the face of the body portion sufficient distance so that, when applied to a bearing, the face portion will contact with the shaft and protect the shaft from scratching contact with the harder portion of the shim 12 and leave a space between the shaft and the front face of the shim 12. Separate facing portions 10 are cast on each of the front corners of the face and are similarly secured by the co-action of the cast metal in the slot 14 and the cast metal tongue in the interlocking groove 20, although it is possible to construct a facing portion co-extensive with the front face of the shim and secured on each corner.

It will thus be seen that as each of the face portions 10 of the shim has an integral extension projecting into the slot 14, as well as a portion secured by the hole 20, the facing portion cannot be removed either transversely or laterally. The restricted neck portion 24 formed by the hole 20 prevents the facing portion from being drawn forward in a plane parallel to the body of the shim and the slot extension 26 of the facing portion 10 prevents the shim from being moved transverse to the main body portion 12.

Figure 4:
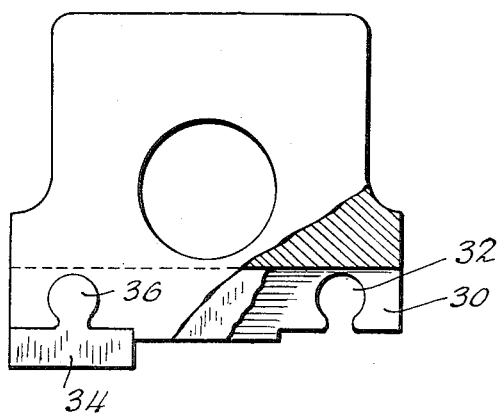

The cast babbitt although being soft is, therefore, firmly secured to the shim and cannot be jarred loose in transportation nor be lost during assembly of a bearing. It extends to the top of the shim and if a lamination 18 is peeled from the shim, it is also possible to cut the babbitt to make it of the same dimension. It is possible to use separate facing portions or to pour the facing portions 10 to extend across the entire side of the bearing although where an oil pocket is desired, the construction shown in Figures 1 and 2 may be preferable. A one piece construction is shown in Figure 4 in which the slot 30 extends entirely across the face of the shim and to a depth slightly behind the hole 32, which forms the interlocking groove for the facing element 34.

The dove-tailing of the tongues in the hole 20 and restricted neck portion 24, while normally insufficient to prevent lateral movement and a dropping out of the facing portion, cooperates with the slot and insert construction and as the mechanical construction only requires grooving and stamping of the body portion, the cost of such construction is extremely low. The babbitt which is cast into the slot 30 and the groove 32 is similarly prevented by the projection in the slot 30 and the tongue 36 in the groove 32 from moving in any direction and the facing elements cannot come loose and be lost.

The shape of the slot may be varied in accordance with commercial practice and operating economy. The V-shaped slot shown in Figure 2 has the advantage that less babbitt is poured, while the construction shown in Figure 4 has the important advantage that but a single machine operation is necessary to form the entire slot. It is desirable that the slot be as small as possible and extend only into the main body portion of the shim a sufficient amount to prevent transverse movement, and it is also desirable that as few machine operations be had as possible to reduce the cost.

A slightly different form of shim construction is shown in Figures 5 to 8, inclusive. In this instance, the shim 50 is provided with facing portions 52 and the apertures 54 to receive the bearing bolts of the bearings, not shown. The body of the shim is pre-formed, as shown in Figures 6 and 8, however, by any preferred means or by assembling the body of the shim with a central extending lamination having a portion extending only from the sides of the remaining laminations, to furnish a bonding tongue 56 for the facing portions, which tongue as shown in Figure 8, is approximately one-third of the thickness of the entire body. The tongue 56, which is on a diagonal line 55, is further cut or stamped along the bearing face, back to the line 57, so that the face of the tongue is a distance behind the front line 58 of the body of the shim. Thus, no part of the main shim extends beyond the front surface of the body portion of the shim 50.

The tongue 56 is suitably apertured at 58, and the aperture is cut open to the front surface of the tongue. The facing portions 52 are then suitably cast to the tongue 56 and these portions 52 thus engage both sides of the tongue 56, and part of the cast metal extends into the aperture 58 having the restricted neck portion. The facing portions also extend beyond the face of the shim, as shown by the portion 52a.

It is not necessary that the tongue 56 be located as shown in Figures 5 to 8, but it may suffice to have the babbitt cast on one side thereof, as shown in Figure 9. In this modification the shim 60 has a tongue 62 projecting from the end, and one surface of the shim is co-extensive with one wall of the tongue. The other walls of the tongue 62 are below the other surface of the shim, preferably below the top or laminated side of the shim and the facing portion is cast thereto in such a manner as to make the soft facing portion 68 adjacent the laminations 64. In such circumstances, it is possible to remove not only the laminations 64 but to so cut the soft babbitt facing portions 68 on the end that the entire shim is reduced in thickness. The shim tongue 62 is also apertured at 66 to prevent lateral disengagement of the facing member, as the tongue prevents transverse movement. It is to be understood that the facing portions 68 are similarly cast into firm contact with the shim and are prevented from movement by the interengagement of the cast metal with the tongue and aperture of the shim, as in the prior instances.

It will be understood that various means other than that shown and described may be used for forming a positive connection between the facing portion and the main body portion of the shim and that either a laminated or solid shim could be used without departing from the scope of my invention and I, therefore, desire a broad interpretation of the invention within the scope and spirit thereof and limited only by the claims appended hereinafter.

I claim:—

1. In a bearing shim of the class described, a combination of an elongated body portion, a front edge, a tongue portion projecting from the ends of said body portion and being recessed from said front portion, said tongue being of substantially less thickness than the body portion and a facing member adapted to be formed on said tongue portion and interlocked thereto, said facing member projecting beyond the face portion of said body member.

2. A shim of the type described comprising a body portion and a facing member secured thereto, a part of said body portion being reduced in thickness behind the front edge of the body portion to form an undercut portion, said undercut portion being transversely perforated, said facing member contacting with said undercut portion behind the front edge of the shim and filling said perforation to prevent relative movement with respect to said body portion, said facing portion extending beyond the front edge of the shim.

3. A shim of the type described comprising a body portion and a facing member and an interlocking connection between said members, said body portion having a front edge and side edges and having reduced portions projecting from the side edges thereof, said latter portions being apertured, said facing member extending into said aperture and contacting with one side of said togue portion, said facing member being of the same thickness as the body portion and flush with the top and bottom thereof.

4. As an article of manufacture of the class described, a laminated shim having an elongated body and reduced projections from said body, spaced back of the face thereof, said reduced projections being angularly formed with respect to said body and being apertured in a transverse plane and facing members interlocked to said reduced projections and apertures therein.

5. A shim for bearings of the class described, including a body member and a facing member interlocked thereto, said body member having reduced tongue portions spaced rearwardly from the front surface of said shim and extending beyond the ends of said body member, said facing member being interlocked with one of said tongue portions, said facing member extending beyond the front surface of said shim and being of substantially the same thickness.

6. A shim of the class described having a body portion, the front edge of said body portion being of equal thickness to the thickness of the body portion, and edge securing portions extending back of the front edge, said edge securing portions being of reduced thickness with respect to the thickness of the body portion, and a facing portion secured to an edge securing portion and extending beyond the front edge of the body portion.

7. A shim for bearings of the class described comprising a body portion having a solid front face substantially the thickness of the shim, a plurality of projections of substantially less thickness than that of the shim extending from the sides of the shim body portion, a plurality of facing members interlocked to said projections at a point behind the front edge of the body portion, said facing members extending beyond the front face of said body portion, said facing members being of substantially the same thickness as the body portion.

8. A shim of the type described comprising a body portion and a facing member and an interlocking connection between said members, said body portion having a front edge and side edges, a tongue of reduced thickness projecting from a side edge thereof, said tongue being of reduced width, the foremost edge of the tongue being spaced to the rear of the front edge of the body portion, said facing member engaging said tongue on at least one side thereof, said point of engagement being behind the front edge of the body portion and extending throughout the full thickness of the projecting portion.

BRADFORD DARRACH.